(12) United States Patent
Ficker et al.

(10) Patent No.: US 8,302,314 B2
(45) Date of Patent: Nov. 6, 2012

(54) METHOD FOR PRODUCING INTERNALLY OR EXTERNALLY PROFILED RINGS AND ARRANGEMENT THEREFOR

(75) Inventors: Thomas Ficker, Raschau (DE); André Hardtmann, Dresden (DE); Mario Houska, Sebnitz (DE)

(73) Assignee: Technische Universität Dresden, Dresden (DE)

( * ) Notice: Subject to any disclaimer, the term of this patent is extended or adjusted under 35 U.S.C. 154(b) by 1378 days.

(21) Appl. No.: 10/567,755

(22) PCT Filed: Aug. 13, 2003

(86) PCT No.: PCT/DE03/02720
§ 371 (c)(1),
(2), (4) Date: Feb. 10, 2006

(87) PCT Pub. No.: WO2005/016575
PCT Pub. Date: Feb. 24, 2005

(65) Prior Publication Data
US 2006/0236545 A1 Oct. 26, 2006

(51) Int. Cl.
*B21D 53/10* (2006.01)
(52) U.S. Cl. ............ 29/898.13; 29/898.04; 29/898.054; 29/898.056; 419/28
(58) Field of Classification Search ....... 29/898–898.15; 419/28
See application file for complete search history.

(56) References Cited

U.S. PATENT DOCUMENTS

| | | | |
|---|---|---|---|
| 3,803,890 A | | 4/1974 | Connell |
| 3,867,751 A | * | 2/1975 | Connell et al. .......... 419/28 |
| 3,992,914 A | * | 11/1976 | Connell .......... 72/106 |
| 4,059,879 A | | 11/1977 | Chmura et al. .......... 29/148.4 |
| 4,126,064 A | * | 11/1978 | Tarrant .......... 82/1.11 |
| T102401 I4 | * | 11/1982 | Toth .......... 29/898.062 |
| 4,612,789 A | | 9/1986 | Andriessen .......... 72/70 |
| 2003/0005739 A1 | | 1/2003 | Hauf .......... 72/105 |

FOREIGN PATENT DOCUMENTS

| | | |
|---|---|---|
| DE | 225 358 | 7/1985 |
| DE | 235 576 | 5/1986 |
| DE | 291 259 | 6/1991 |
| DE | 292 161 | 7/1991 |
| DE | 292 162 | 7/1991 |
| DE | 195 26 900 | 1/1997 |
| DE | 197 43 055 | 4/1999 |
| DE | 198 49 182 | 4/2000 |
| DE | 199 20 163 | 11/2000 |
| DE | 102 19 441 | 9/2003 |
| EP | 1 029 614 | 8/2000 |
| GB | 507 312 | 6/1939 |
| SU | 1 733 171 | 5/1992 |

* cited by examiner

*Primary Examiner* — Richard Chang
(74) *Attorney, Agent, or Firm* — Gudrun E. Huckett

(57) ABSTRACT

In a method for manufacturing internally and/or externally profiled rings from pipe material or solid material, machine-cutting processes and forming processes are combined with one another sequentially, parallel, or sequentially and parallel, wherein one of the forming processes is roll forming. During roll forming a counterforce is generated relative to a flow direction of the starting material so that a material flow in at least one of an axial direction and a radial direction of the starting material is controlled such that flowing material is integrated into a profile to be shaped on the ring.

14 Claims, 5 Drawing Sheets rolled twin profile pre-ring for next rolling step rings are finish-machined by machine-cutting and cut off

METHOD FOR PRODUCING INTERNALLY OR EXTERNALLY PROFILED RINGS AND ARRANGEMENT THEREFOR

BACKGROUND OF THE INVENTION

The invention concerns a method and arrangement for a combined forming and machine-cutting manufacture of internally and/or externally profiled rings from pipe (tubular) material or solid material by means of radial-axial pipe roll forming in combination with turning. The method and the arrangement serve for manufacturing, inter alia, cylindrical starter rings, rolling bearing rings, and transmission rings or the like.

The manufacture of profiled rings, in particular rolling bearing rings, preferably from pipe material, is carried out either purely by machine-cutting or by a combination of machine cutting and forming.

In the case of machining purely by machine-cutting, which is very material-intensive, highly efficient multi-spindle automatic lathes can be used for a dimensional range of less than 100 mm outer diameters, wherein by single ring or multiple ring machining, preferably two ring machining, one or several, preferably two, grinding-ready profiled rings are simultaneously produced without requiring re-clamping from one machine to another.

In certain combined methods, comprised of at least two working steps on different machines, first a so-called blank, i.e., a cylindrical starter ring, beginning with pipe material or rod material, is machined also purely by machine-cutting or by a combination of machine-cutting and forming; subsequently, the blank is profiled by axial or tangential pipe roll forming to the grinding-ready state. These combined methods for producing profiled rings save more material in comparison to the purely machine-cutting processing on multi-spindle automatic lathes and are more beneficial in relation to the practical use properties but require as a result of at least one additional clamping action of the blank (starter ring) for profiling of the ring an increased expenditure in regard to working time because of the required machining on at least two different machines until a grinding-ready ring is produced. An example of such combined methods of at least two working steps is disclosed in DE 198 49 182 A1 where influencing the process-caused axial or tangential material flow is the goal. The effect on the material requires however at least two rolling steps (working steps) which is one of the already described significant disadvantages of such a manufacturing possibility.

The economic field of application of the aforementioned methods resides in particular in the dimensional range of greater than 100 mm outer diameter and concerns primarily outer and inner rings (rolling bearing rings and transmission rings) with symmetric cross-sectional shape. Moreover, there are proposed solutions (DE 197 43 055 A1, DE 199 20 163 A1) for manufacturing rings with asymmetric cross-sectional shape by tangential pipe roll forming; however, no practical use is currently known.

Further manufacturing processes for manufacturing profiled rings are based on a combination of an initial forming step by axial pipe roll forming and/or roll grooving and subsequent finishing by machine-cutting by a turning step starting from pipe material (DD 225 358 A1) or an initial machine-cutting preparation of pipe material (DD 292 162 A5) or rod steel (DD 292 161 A5) with a subsequent forming step by axial pipe roll forming and/or roll grooving as well as finishing by machine-cutting of a ring in sequence and/or in parallel on a multi-spindle automatic lathe with integrated rolling device; however, they concern exclusively externally profiled rings with symmetric or asymmetric cross-sectional shape, for example, inner rings for radial deep groove ball bearings or taper roller bearings.

In DE 195 26 900 A1 machine-cutting methods such as turning and forming methods such as axial pipe roll forming and/or roll grooving are combined in such a way that at least one ring can be profiled to a grinding-ready state by forming and/or machine-cutting simultaneously the inner side and outer side in order to enable by means of the aforementioned method combination in addition to the above described manufacture of externally profiled rings, for example, rolling bearing inner rings, also the manufacture of internally profiled rings, for example, rolling bearing outer rings.

In the case of the last-mentioned manufacturing processes, a machine is used for machine-technological realization of the method combination that enables profiling by forming of the external and internal contours of the rings with machine-cutting finishing of all further shaped elements and surface elements of the ring, including separation of the ring from the pipe as the last working stage in a process without reclamping.

Advantageously, the unmachined pipe is pre-turned by turning to size the external diameter and/or internal hollowing by turning before the forming step by axial pipe roll forming and/or roll grooving, wherein at the same time optionally required minimum cutting removal or the present edge decarburizaton of the employed starting material is taken into account.

The economic field of application of the manufacturing method for combined forming and machine-cutting processing by axial pipe roll forming/roll grooving—turning for producing profiled rings is within the dimensional range of approximately 40 to 160 mm outer diameter and comprises inner and/or outer profiled rings (rolling bearing rings and transmission rings) with symmetrical as well as asymmetrical cross-sectional shape. Moreover, the possibility of manufacturing starter rings for subsequent processing by machine-cutting or forming, for example, by axial or tangential pipe roll forming is made possible. This is advantageous particularly when the starter rings for the subsequent rolling must be pre-profiled as is mandatory in the case of complex ring geometries for axial or tangetial roll forming.

The process sequences disclosed in DD 225 358 A1, DD 292 162 A5, DD 292 161 A5, and DE 195 26 900 A1 have in common that an unhindered axial material flow occurs when axial pipe roll forming and/or roll grooving is performed. The result is that the pipe or ring during the rolling process becomes wider or longer in accordance with the material volume (up to 100%) that is being displaced by the profile of the tool. This effect is desired in the context of high material utilization and economic efficiency for ring manufacture. When processing rings having great and deep rectangular profiles (grove-like profiles), for example, in synchromesh transmission rings or selector sleeves, this effect causes problems in regard to obtaining the required precision (symmetries).

It is an object of the invention to provide a method and arrangement of the aforementioned kind with which a higher precision for the manufacture of rings with great and deep rectangular profiles (groove-like profiles), for example, in the case of synchromesh transmission rings or selector sleeves.

SUMMARY OF THE INVENTION

In accordance with the invention, this object is solved for a method of the aforementioned kind in that during rolling of the profile a counterforce with regard to the flow direction of the pipe material is generated so that the material flow in axial and/or radial direction can be controlled such that the flowing material is incorporated into the shaping of the profile.

By generating a counterforce or a counterpressure, the previously unhindered axial material flow is counteracted by applying a defined force. In this way, the possibility of controlling the material flow in optionally axial and/or radial (in the direction toward the outer diameter of the pipe) direction is provided so that the previously occurring problems, for example, in the case of synchromesh transmission rings and selector sleeves, with regard to obtaining the required precision, particularly with regard to symmetry of groove-like profiles, are solved.

Advantageous variants of the method result from the features disclosed in the dependent claims.

The object is solved furthermore by an arrangement for manufacturing internally and/or externally profiled rings, in particular rolling bearing rings and transmission rings in a completely grinding-ready state from pipe material or solid material, comprising a rolling device with an outer profile rolling tool and an inner profile rolling tool and optionally further devices for turning, in that the inner profile rolling tool has an axially moveable counterpressure tool for limiting the material flow which has a contact surface for the pipe to be formed which contact surface projects past the outer diameter of the inner profile rolling tool so that the material flow can be controlled in axial and/or radial direction.

For a targeted control of the axial material flow, the axial movability of the outer profile rolling tool can be promoted or limited additionally by a hydraulic and/or mechanical system.

The use of such a counterpressure device (including rolling arbor) leads to a significant broadening of the known method combination axial pipe roll forming (and/or roll grooving)—turning toward a complete novel method combination "radial-axial pipe roll forming" and/or "roll grooving—turning". A further advantage of this method combination with controllable axial material flow is that from a pipe having a "smaller" outer diameter rings with (slightly) greater outer diameter can be produced; this is the result of the radial material flow (toward the outer pipe diameter) that can now be controlled in a targeted way. By using the radial-axial pipe roll forming process there are now manufacturing possibilities for producing a significantly broader spectrum of parts than with the prior known methods and solutions.

BRIEF DESCRIPTION OF THE DRAWINGS

The invention will be explained in the following in more detail with the aid of embodiments. The drawings show in.

DESCRIPTION OF THE PREFERRED EMBODIMENTS

In FIGS. 1 through 4, the inventive combination of machine-cutting and forming methods by radial-axial profile pipe roll forming—turning with counterpressure device for material flow control is illustrated with the aid of the correlated processing course (single ring machining) in accordance with the spindle positions I to IV of a four-spindle automatic lathe with integrated rolling device, based on the example of a synchromesh transmission ring starting with a pipe and using a single clamping action.

Figure 4:
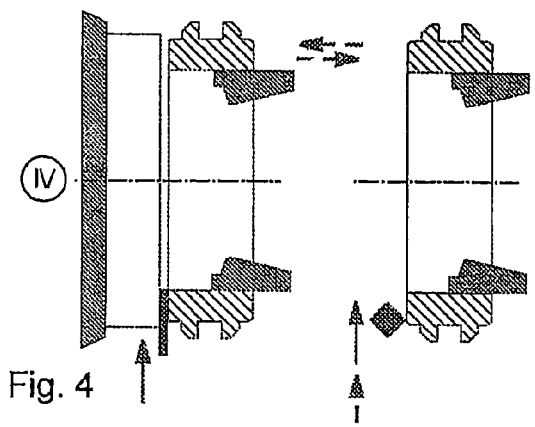
FIG. 4 (spindle position IV): cutting-off the synchromesh transmission ring 4 with cut-off turning tool and facing (second ring side) with facing tool.
Figure 3:
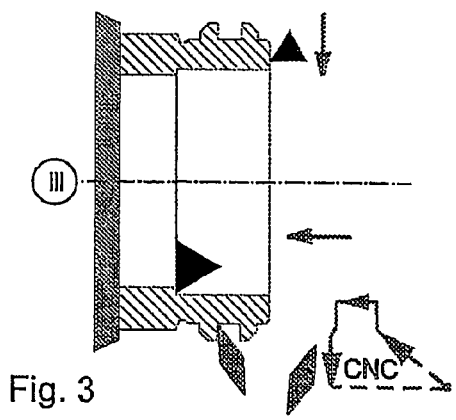
FIG. 3 (spindle position III): facing (first ring side) with facing tool, hollowing by turning (taking the finishing cut) with hollowing tool and CNC contour turning (taking the finishing cut) with turning tool.
Figure 1:
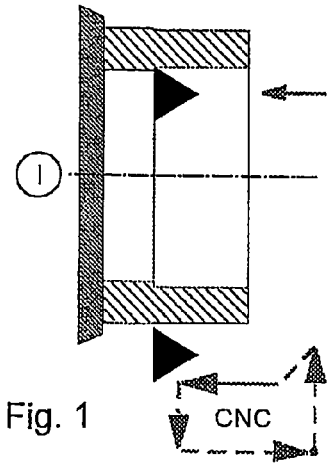
FIG. 1 (spindle position I): turning the outer diameter with external turning tool and inner hollowing by turning with inner turning tool of the pipe 1.
Figure 2:
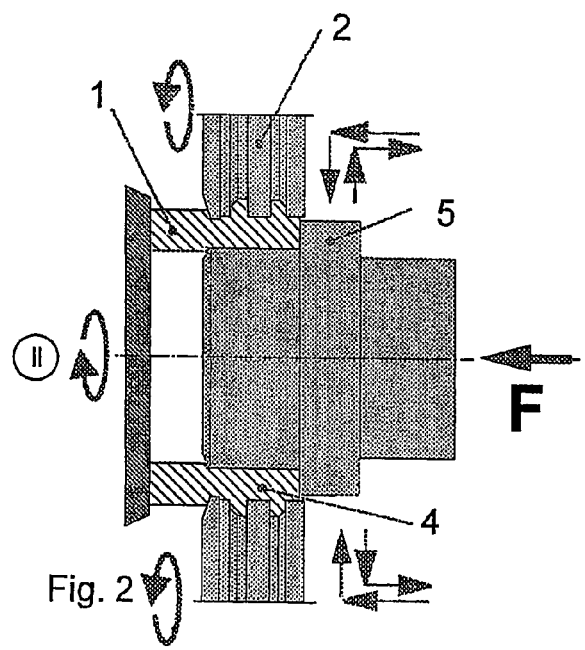
FIG. 2 (spindle position II): (outer) radial-axial pipe roll forming/roll grooving with profile rolling tool 2 and counterpressure tool (including rolling arbor) 5.
Figure 5A:
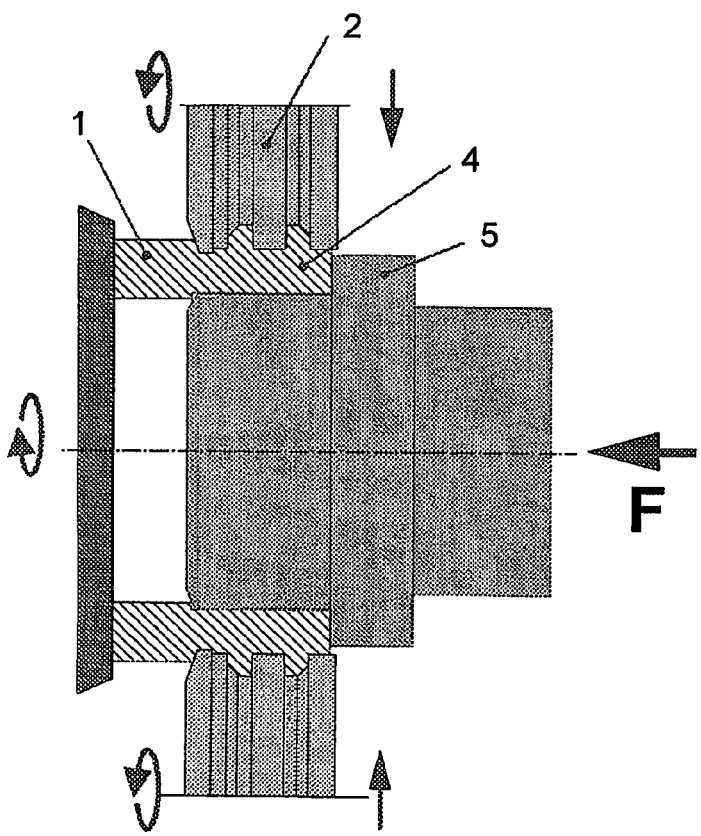
FIG. 5a (external) radial-axial pipe roll forming/roll grooving of the pipe 1 with outer profile rolling tool 2 and counterpressure tool (including rolling arbor) 5 and synchromesh transmission ring 4 profiled in this way.
Figure 5B:
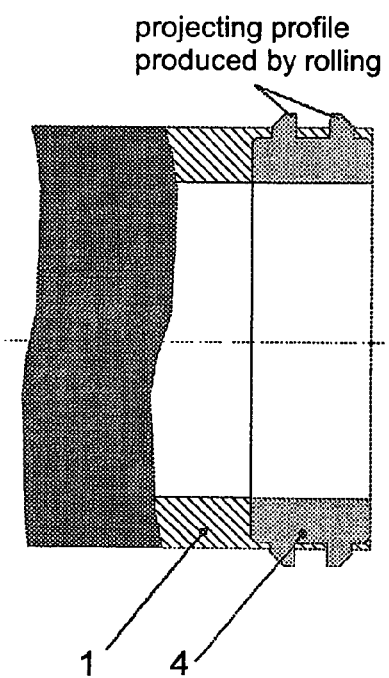
FIG. 5b synchromesh transmission ring with projecting profile produced by rolling from a starter pipe of a smaller diameter with a tool configuration as illustrated in FIG. 5a for controlling the material flow in axial and radial directions.

In the spindle position I, turning of the outer diameter and hollowing out by turning of the employed starting pipe 1 are performed first. In the spindle position II, the (outer) radial-axial pipe roll forming/roll grooving with profile rolling tool 2 in accordance with the outer contour of a synchromesh transmission ring with counterpressure tool (including rolling arbor) 5 (see also FIG. 5a) for controlling the material flow is carried out so that in the considered application scenario the axial material flow is partially hindered and, as a result of this, partially guided in the radial direction. In this way it becomes possible to produce from a pipe 1 of a smaller diameter a synchromesh transmission ring 4 of a (slightly) greater diameter (see FIG. 5b). The allowed axial material flow must be taken into consideration upon pipe advancement for the purpose of securing the required workpiece width.

In the spindle positions III and IV, the finishing operation by machine-cutting of the remaining shape elements and surface elements of the ring is realized by the separation of the completely grinding-ready profiled synchromesh transmission ring 4 from the pipe 1 as the last working stage.

In this connection, in the spindle position III, facing of the first ring side, hollowing out by turning, and CNC contour turning of the outer contour are performed. The two last-mentioned working steps are only operations for taking the finishing cut. In the repeated inner hollowing out by turning step, the "rolling traces" that are caused by the radial-axial pipe roll forming in the inner diameter of the pipe or the ring are removed. The CNC contour turning is purely a "safety measure" and serves only for ensuring 100% safety in regard to fulfilling the precision requirements. Generally, the CNC contour turning is not required because the required precision of the outer contour is achieved by the radial-axial pipe roll forming by using the counterpressure device. In the spindle position IV, the cut-off of the complete grinding-ready profiled synchromesh transmission ring 4 from the pipe 1 as well as facing of the second ring side are carried out.

The turning of the outer diameter illustrated in the spindle position I and the inner hollowing out by turning are not required in every case when using starting material with an appropriate surface quality as well as with outer and inner diameters that match the machining task, wherein by radial-axial pipe roll forming/roll grooving the dimensions of the outer and inner diameters can be changed within a minimal tolerance range.

When by means of the manufacturing process described in connection with FIGS. 1 through 4, a selector sleeve with inner toothing is to be produced, its outer contour can be rolled to be completely grinding-ready while the toothing in the inner diameter is realized by machine-cutting on a downstream device in a separate working step; advantageously, interlinking of the devices is realized.

Figure 6A:
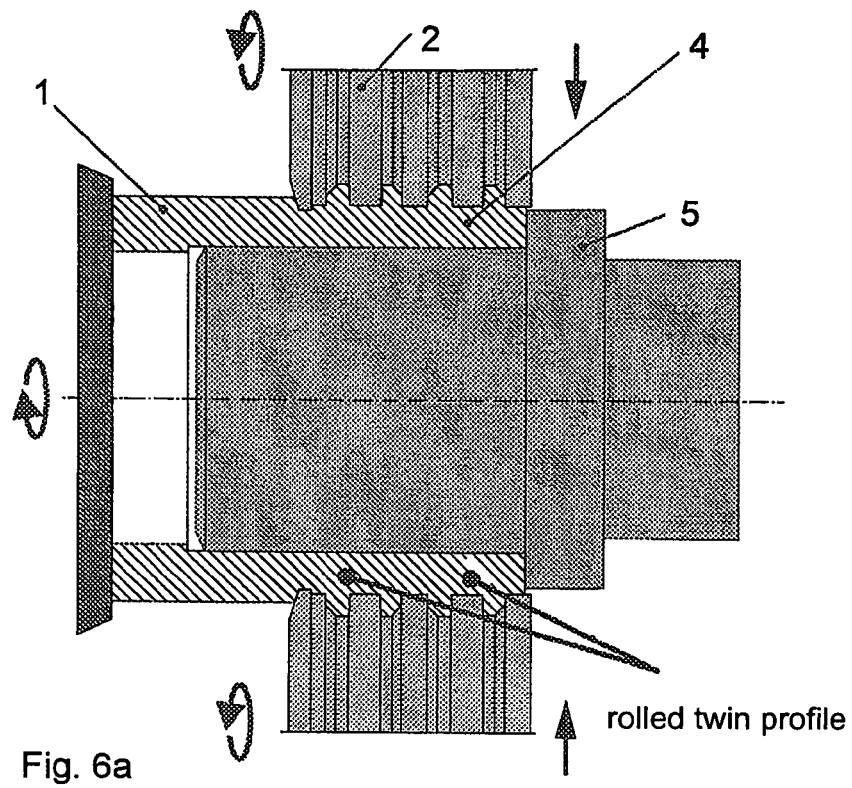
FIG. 6a a twin profile that is produced by rolling on a starter pipe 1 and corresponds to the outer contour of two synchromesh transmission rings.
Figure 6B:
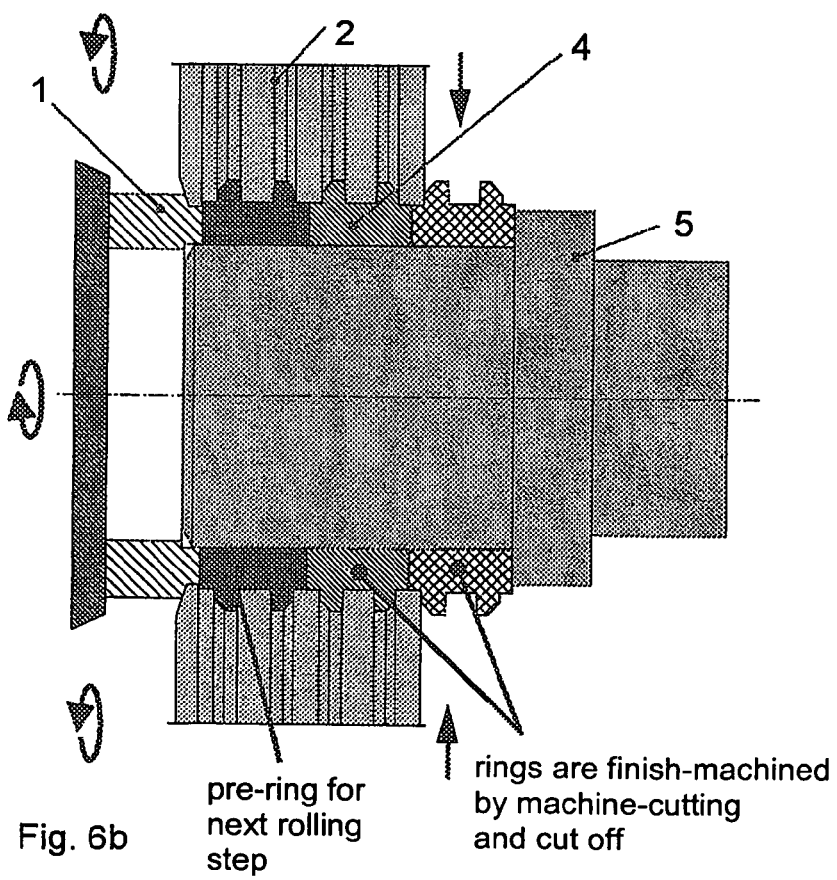
FIG. 6b twin profile that is produced by rolling on a starter pipe 1 and corresponding to the outer contour of synchromesh transmission rings 4 for rolling with so-called "pre-ring"

The manufacturing process illustrated in FIGS. 1 through 4 is also suitable for realizing two-ring or multi-ring processing, i.e., in this case the radial-axial pipe roll forming is carried out with profile rolling tools in accordance with the outer contour of two or more synchromesh transmission rings. Advantageous in this connection is rolling with a so-called "pre-ring" (FIG. 6). This means that first a ring profile—remaining on the pipe—is rolled by radial-axial pipe roll forming and, subsequently, two more ring profiles, for example, are rolled, so that three rolled ring profiles are provided on the pipe. The third ring profile remains on the pipe while the two upstream ring profiles are finished by machine-cutting and subsequently separated from the pipe; the remaining third ring profile provides the "pre-ring" in the subsequently repeated manufacturing process. In this way, the rolling process is significantly stabilized because rolling on the pipe end is prevented and the tool engagement is not realized directly at the pipe end but at a spacing of at least one ring width away from the pipe end. In this way, even for a multi-ring processing the precision requirements can be fulfilled without problems. Because of the rolling with "pre-ring", a mutual influencing of the individual ring profiles as a result of axial material flow is prevented. This variant is realizable with and without use of a counterpressure device.

The manufacturing process indicated in the embodiment for preferably pipe material is also possible in a modified way when using rod steel as a starting material, in particular, in the case of smaller ring dimensions.

Figures 7A, 7B:
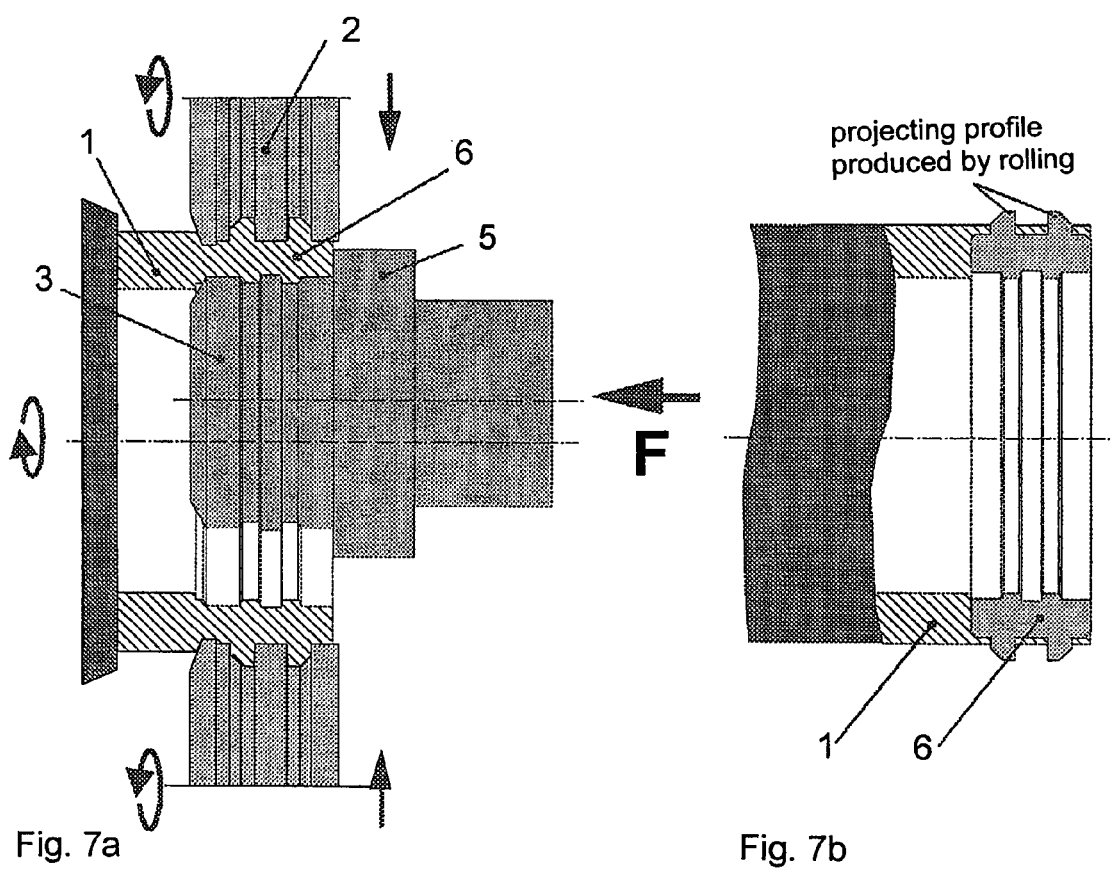
FIG. 7a radial-axial pipe roll forming/roll grooving with outer profile rolling tool 2 and inner profile rolling tool (including rolling arbor) 3 of the starter pipe 1 and synchromesh transmission ring 6 profiled in this way.
FIG. 7b profiled synchromesh transmission ring (having internal and external profiles) with greater diameter profiled from a starter pipe of a smaller diameter with a tool configuration as illustrated in FIG. 7a for controlling the material flow in axial and radial directions.

When a workpiece, for example, the synchromesh transmission ring illustrated in FIGS. 1 through 4, is to be manufactured which ring, in addition, has a circumferential inner profile 6, there is the possibility of producing, with an appropriate method configuration, the inner and outer contours of the ring simultaneously either by forming by radial-axial pipe roll forming and/or roll grooving or by producing one of the two contours purely by machine-cutting by turning in sequence and/or in parallel. In this connection, all working stages can be performed also in one working process on a machine, including separation of the profiled ring that is completely grinding-ready from the pipe as the last working step. FIG. 7 shows simultaneous radial-axial pipe roll forming of the outer and inner contours of such a workpiece.

For the machine-technological realization of the manufacturing process illustrated in FIGS. 1 through 4 there are two advantageous arrangement variants.

On the one hand, the object in accordance with the invention is solved with an arrangement as shown in DE 195 26 900 A1. In this connection, on a known multi-spindle automatic lathe at one spindle position a rolling device is provided.

Figure 8:
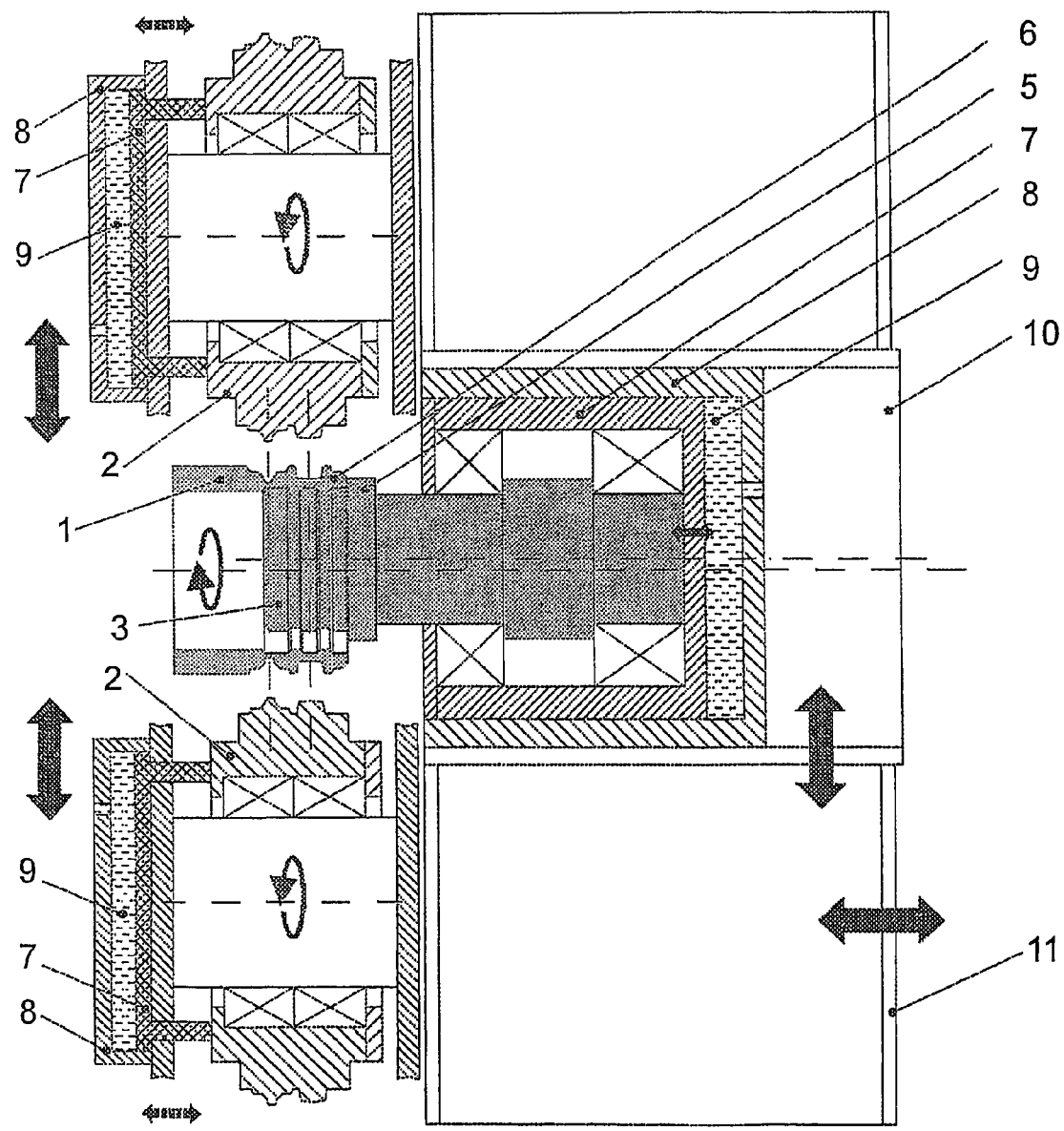
FIG. 8 schematic illustration of a rolling device for targeted control of the axial and radial material flow with hydraulic and/or mechanical assistance.

The rolling device has diametrically arranged axially movably supported, optionally driven or non-driven, outer profile rolling tools that are arranged on a common base plate for avoiding radial forces on the spindle bearing. The axial movability of the outer profile rolling tools, as a function of the application, can be promoted or limited by a hydraulic and/or mechanical systems so that a targeted control of the axial material flow is possible. The outer profile rolling tools can be advanced by a radial advancing force that effects the penetration into the pipe. In the spindle position 11 for receiving either an optionally driven or non-driven inner profile rolling tool a compound slide 10 is installed on an additional compound slide 11 in order to realize with a radial advancing force tool penetration into the pipe. In combination therewith, but also separately, a counterpressure device (including rolling arbor) can be received on the compound slide 10, wherein the counterpressure itself, for example, is applied in a defined fashion by a hydraulic and/or mechanical system that is to be additionally integrated. This additional system is shown in FIG. 8 as a hydraulic system. Depending on the size of the pressure of the hydraulic medium 9 in the hydraulic cylinder 8, by means of the hydraulic piston 7 and the counterpressure tool 5 the axial material flow to the pipe end can be reduced or can be "reversed" in the direction toward the clamping location. At the same time, a radial material flow to the outer diameter is enabled in this way. By properly selecting the hydraulic pressure that can be changed during the rolling process the required precision with regard to dimensional compliance, in particular symmetry, of the groove-like profiles is ensured.

Advantageous for a machine-technological realization of a method combination that is referred to as radial-axial pipe roll forming process is an arrangement based on a (multi-spindle) automatic lathe with integrated rolling device which arrangement is especially designed therefor. A simple solution is in the form of a single-spindle machine wherein the configuration conforms to a modular system when an optional retrofitting or stripping down of the machine in regard to spindle positions, rolling devices, and turning units as a function of the degree of complexity of the ring to be manufactured is ensured.

Important in connection with the arrangement according to the invention is that simultaneously inner and/or outer profiles of a ring can be produced by forming and/or by machine-cutting in a single clamping action wherein the separation of the completely grinding-ready profiled ring from the pipe representes in any case the last working step.

It is also possible to realize the machine-technological realization of the method combination radial-axial pipe roll forming—turning on several interlinked modified profile rolling machines and lathes, at least however with one profile rolling machine and one lathe. The profile rolling machine employed for this purpose is designed such that it corresponds to the illustration of the rolling device illustrated in FIG. 8.

The important features of this arrangement reside in that a profile rolling machine has correlated therewith one (or several) processing devices for machine-cutting or lathes that separate the ring from the pipe, immediately after profiling by forming by means of radial-axial pipe roll forming, by forming and/or by machine-cutting, and the finishing operation by machine-cutting of the ring is realized not until it is already "separated" from the pipe. In this way, the separated—pre-profiled—ring is received by the downstream processing devices for machine-cutting or lathes without intermediate storage.

While the first variant is particularly suitable for "smaller" ring dimensions (approximately 40 to 100 mm outer diameter), the second variant is particularly suitable for "larger" ring dimensions (approximately 100 to 160 mm). In principle, both arrangement variants are technically as well as economically suitable for a dimensional range of approximately 40 to 160 mm outer diameter. Broadening of the outer diameter range to greater than 160 mm is possible.

List of Reference Numerals
1—pipe
2—outer profile rolling tool
3—inner profile rolling tool
4—synchromesh transmission ring (without inner profile)
5—counterpressure tool (including rolling arbor)
6—synchromesh transmission ring with inner profile
7—hydraulic piston
8—hydraulic cylinder
9—hydraulic medium
10—compound slide (vertically movable)
11—compound slide (horizontally movable)

What is claimed is:

1. A method for manufacturing internally and/or externally profiled rings from tubular starting material, the method comprising the steps of:
   clamping in a clamping position on a spindle a tubular starting material having an axial length greater than an axial length of a profiled ring to be manufactured;
   roll forming in said clamping position an end section of the tubular starting material to shape at least one ring profile;
   performing in said clamping position prior to, parallel to, or after the roll forming process machine-cutting on the end section or on the at least one ring profile;
   generating during the roll forming process an axial counterforce at an end face of the end section of the tubular starting material relative to a flow direction of the tubular starting material by an axially arranged counterpressure tool so that a material flow in at least one of an axial direction and a radial direction of the tubular starting material is controlled such that flowing material is integrated into the ring profile;
   cutting off in said clamping position the at least one ring profile from the tubular staring material as a completely grinding-ready profiled ring.

2. The method according to claim 1, wherein the profiled ring is a rolling bearing ring or a transmission ring.

3. The method according to claim 1, wherein the counterforce counteracts an unhindered material flow in the axial direction by a defined force being applied such that the material flow is directed optionally in the at least one of the axial direction and the radial direction.

4. The method according to claim 1, further comprising the step of promoting axial movability of an outer profile rolling tool during roll forming by at least one of hydraulic means and mechanical means for controlling the material flow in the axial direction.

5. The method according to claim 1, further comprising the step of limiting axial movability of an outer profile rolling tool during roll forming by at least one of hydraulic means and mechanical means for controlling the material flow in the axial direction.

6. A method for manufacturing internally and/or externally profiled rings from tubular starting material, the method comprising the steps of:
   combining machine-cutting processes and forming processes with one another sequentially, parallel, or sequentially and parallel, wherein one of the forming processes is a roll forming process;
   generating during the roll forming process of a tubular starting material an axial counterforce relative to a flow direction of the tubular starting material by an axially arranged counterpressure tool so that a material flow in at least one of an axial direction and a radial direction of the tubular starting material is controlled such that flowing material is integrated into a profile to be shaped on a profiled ring being manufactured;
   further comprising for realizing a two-ring or multi-ring machining of an outer contour matching an outer contour of two or several rings the step of:
   simultaneously rolling two or several rings together with a pre-ring on a pipe, wherein first a ring profile remaining on the starting material is rolled by at least one of (radial) axial pipe roll forming and roll grooving and, subsequently, additional ring profiles are rolled so that several rolled ring profiles are generated on the pipe, wherein the last ring profile remote from a pipe end remains without further machining on the pipe and the ring profiles close to the pipe end are finished by machine-cutting and subsequently separated from the pipe, wherein the last ring profile is a pre-ring during a subsequently repeated processing course.

7. The method according to claim 1, wherein at least one of an inner profiling and an outer profiling of the rings is performed with a single clamping action.

8. An arrangement for manufacturing internally and/or externally profiled rings from tubular starting material, the arrangement comprising:
   a spindle for clamping thereon a tubular starting material having an axial length greater than an axial length of a profiled ring to be manufactured;
   at least one rolling device with an outer profile rolling tool and an inner profile rolling tool that roll forms the an end section of the tubular starting material in said clamping position to shape at least one ring profile;
   a machine cutting device performing in said clamping position prior to, parallel to, or after the roll forming process machine-cutting on the end section or the at least one ring profile;
   wherein the inner profile rolling tool has an axially movable counterpressure tool generating during roll forming a counterforce relative to a flow direction of a tubular starting material and limiting a material flow and forming a contact surface for the tubular starting material, wherein the counterpressure tool projects past an outer diameter of the inner profile rolling tool so that the material flow of the tubular starting material is controlled in at least one of an axial direction and a radial direction of the pipe such that flowing material is integrated into a profile to be shaped on the ring;
   a cut-off device that separates in said clamping position the at least one ring profile from the tubular starting material as a completely grinding-ready profiled ring.

9. The arrangement according to claim 8, wherein the rings are rolling bearing rings and transmission rings in a completely grinding-ready state.

10. The arrangement according to claim 8, further comprising a lathe.

11. The arrangement according to claim 8, comprising a multi-spindle automatic lathe, wherein the rolling device with the outer profile rolling tool and the inner profile rolling tool is arranged at one spindle position of the automatic lathe.

12. The arrangement according to claim 8, wherein the rolling device has correlated therewith one or several processing devices for machine-cutting or lathes, wherein the processing devices for machine-cutting or lathes separate the ring from the pipe, immediately after profiling by forming by radial-axial pipe roll forming, by forming and/or by machine-cutting, and wherein finishing by machine-cutting of the ring is not realized until the ring is already separated from the pipe, wherein the separated and pre-profiled ring is transferred to downstream processing devices for machine-cutting or lathes without intermediate storage.

13. The arrangement according to claim 8, wherein the inner and outer profile rolling tools are axially movable by correlated hydraulic pistons and hydraulic cylinders, respectively.

14. The arrangement according to claim 8, wherein the inner profile rolling tool with the counterpressure tool is connected by a pressure-loadable piston cylinder arrangement to a compound slide.

* * * * *